Nov. 28, 1944.     C. F. A. WHITE     2,363,764
COLOR PHOTOGRAPHY
Filed Aug. 1, 1940     2 Sheets-Sheet 1

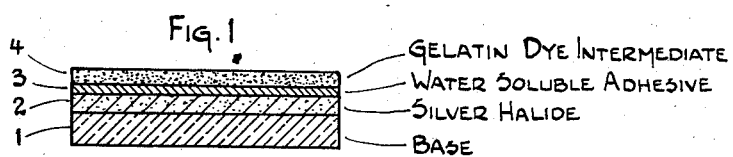

Fig. 1
4 — Gelatin Dye Intermediate
3 — Water Soluble Adhesive
2 — Silver Halide
1 — Base

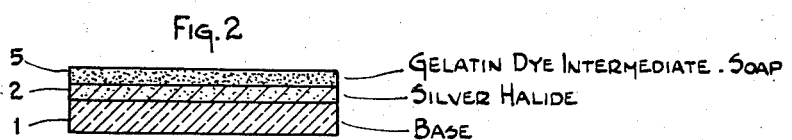

Fig. 2
5 — Gelatin Dye Intermediate . Soap
2 — Silver Halide
1 — Base

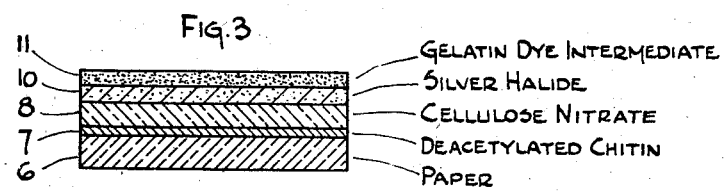

Fig. 3
11 — Gelatin Dye Intermediate
10 — Silver Halide
8 — Cellulose Nitrate
7 — Deacetylated Chitin
6 — Paper

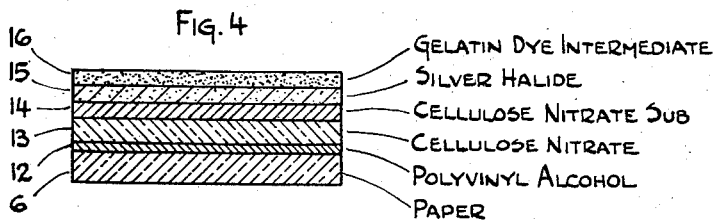

Fig. 4
16 — Gelatin Dye Intermediate
15 — Silver Halide
14 — Cellulose Nitrate Sub
13 — Cellulose Nitrate
12 — Polyvinyl Alcohol
6 — Paper Inventor
Clayton F. A. White
By Lynn B. Morris
Attorney

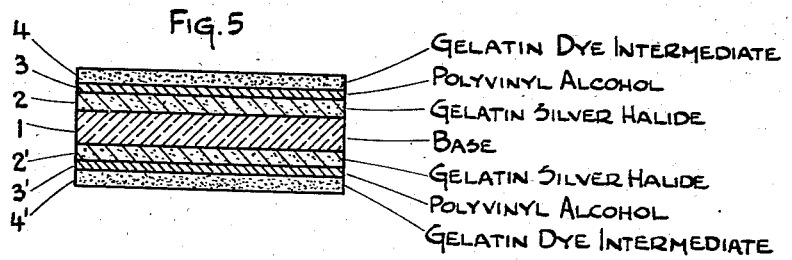
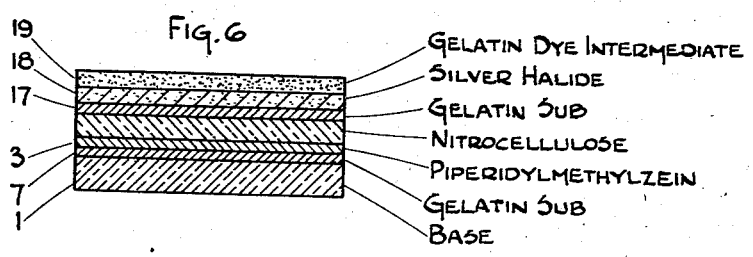
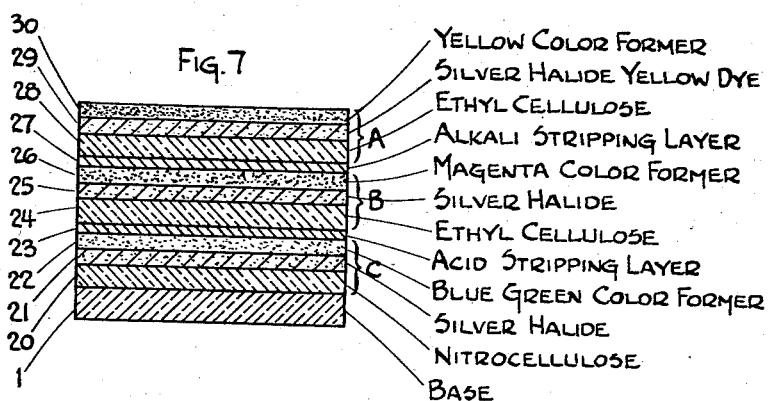

Patented Nov. 28, 1944

2,363,764

UNITED STATES PATENT OFFICE 2,363,764

COLOR PHOTOGRAPHY

Clayton F. A. White, Stelton, N. J., assignor, by mesne assignments, to E. I. du Pont de Nemours & Company, Wilmington, Del., a corporation of Delaware Application August 1, 1940, Serial No. 349,310

21 Claims. (Cl. 95—8)

This invention relates to new photographic elements and more particularly to new photographic stripping elements. Still more particularly, it relates to new photographic stripping elements for color photography. The invention also relates to methods of releasably attaching light sensitive layers and/or dye intermediates or color former layers with a support and to processes of color photography.

An object of this invention is to provide new and novel photographic stripping films. A further object is to provide a stripping film in which a dye image can be stripped from a silver or silver salt layer. Another object is to provide a stripping film containing separate dye intermediate or color former layers and light sensitive layers. A further object is to provide a photographic film wherein a color scene or component color aspects may be faithfully recorded. Another object is to provide a new and improved stripping film for multicolor photography.

Still other objects will appear hereinafter.

In many photographic arts, particularly in photo-mechanical, graphic and color photographic arts, it is desirable to transfer emulsion layers from the support on which they were originally affixed to another or permanent support. These films are commonly known as stripping films, inasmuch as the original light sensitive layer is releasably connected with the support or base which is usually composed of paper, or a cellulose derivative or synthetic resin or polymeric compound. The sensitive emulsions of such films are coated on a thin menstruum or layer of collodion which in turn has been coated onto an adhesive layer which is carried by a suitable support. The adhesive layers have the common characteristic that they are softened and/or dissolved in water, acid or in alkaline developer baths, which enable the image forming layer to be removed or stripped from the element or base.

The present invention provides new and useful stripping films which are quite distinct from those of the prior art in that they comprise before processing separate dye intermediate or color-forming layers and light sensitive silver salt layers. The dye intermediate or color former layer or layers comprise an immobile dye intermediate or color former capable of forming a dye taken from the class consisting of quinoneimine and azo methine dyes and preferably a dye taken from the class consisting of indophenol, indoaniline and azomethine dyes by color forming development and also an azo dye by azo-coupling.

The immobile dye intermediate or color former layer or layers and co-acting separate light sensitive or reducible silver salt layer constitute a color yielding unit. Upon color forming development a dye image is formed in the dye intermediate layer and a silver image in the sensitive layer which can be removed. The dye intermediate layer or layers may be directly imposed on the light sensitive silver salt layer or a water permeable colloid layer may be placed between such layers. A stripping layer or stratum may be placed between the co-acting dye intermediate or color former layers and co-acting layer or between color yielding units and the base or both. Thus, after color forming development, it is possible to remove the dye image layer from the rest of the film.

A plurality of such units may be releasably attached to each other and to a single temporary support in elements which are useful in multicolor photography. In which cases the units can be designated as color yielding component units. The dye intermediate or color former layer or layers of one or more of such units can be stripped from the silver salt layer of the respective unit which in some instances is advantageous in that the silver and silver salt residues do not have to be removed from the colored image.

The separate immobile dye intermediate or color former layers may be of two general types: (1) composed of an immobile dye intermediate or color former uniformly distributed or dispersed in a water permeable binding or supporting agent, (2) composed of film forming material containing within its structure, dye forming nuclei, i. e., nuclei capable of forming an indophenal, indoaniline or azomethine dye on color forming development and an azo dye on appropriate treatment. In this embodiment the color former itself constitutes a layer or stratum of the film.

The film elements before exposure or processing comprise a base and at least two co-acting contiguous layers, one of which comprises a colloidal binding agent, a light sensitive silver salt and usually a sensitizing dye and the other of which comprises an immobile dye intermediate or color former and are so constructed that a stratum or strata are water soluble or swellable so that the dye intermediate or color former layer after development can be removed from the base alone or together with its coacting silver salt layer or subsequent to the removal of the color yielding unit from the base.

It will be readily apparent to those skilled in the art from the general considerations above, that the invention is of considerable magnitude and is not limited to one or two specific types of photographic elements. In all instances, however, the immobile dye intermediates or color formers are maintained in a separate layer from the co-acting light sensitive silver salt layers, generally silver halide gelatin layers, but do not have any water impermeable layers or membranes therebetween.

The invention will be briefly exemplified by the following description of the preparation and color processing of a simple 3-layer stripping film and this explanation may make the more complex ramifications of the invention more readily understood. A cellulose acetate film base suitably subbed is coated with a thin coating of a silver bromide emulsion, next is applied a thin coating of sodium cellulose glycollate and next a gelatin dispersion of a color former which is substantive to or immobile in gelatin, e. g., 1,5-stearylamino-naphthol is coated to form a thin layer. The film is exposed to an object field and then developed with an arylenediamine containing an unsubstituted amino group, whereupon silver images are formed in the light sensitive emulsion layer and dye images in the color former layer. The color layer may then be stripped from the emulsion layer and base, placed on a temporary and/or permanent support. A thin transparent membrane can be attached to the gelatin dye intermediate or color former layer if desired to give more strength prior to stripping.

In an important embodiment of the invention a light sensitive or reducible silver salt layer is imposed on the base, next a stripping layer and then an immobile dye intermediate or color forming layer. In a modification of this embodiment a thin layer of a water insoluble water-permeable colloid such as cellulose derivatives, e. g., lower alkyl ether esters, regenerated cellulose, gelatin, agar-agar, etc., may be interposed between the dye intermediate or color former layer and the respective co-acting reducible silver salt emulsion layer and the stripping layer may be interposed between the color yielding layer and the colloid layer or between the latter and the silver salt layer. In a further modification the dye intermediate or color former layer or colloid layer may contain a surface active agent which enables them to be stripped from the remainder of the film element.

In stripping films for multicolor photography as previously indicated, the elements comprise a plurality of color yielding component units, that is, a plurality of layers wherein the dye intermediates or color formers cooperate with the contiguous co-acting light sensitive layers; and at least one stripping layer. In general, for direct positive color images obtained by reversal methods, the dye intermediates or color formers should form a dye upon development which is complementary in color to the utilized sensitivity of the respective silver salt layer which is generally initially a silver halide emulsion layer.

For multicolor photography, as described above, the elements comprise a plurality of strippable color yielding component units, that is, a plurality of layers wherein the color formers cooperate with the co-acting light sensitive layers. The units embodied in a single element which may be a mono- or multi-pack are so arranged and/or sensitized that each unit will produce a dye image having a color corresponding to a different band of the color spectrum.

An important aspect of the invention is concerned with elements having a single color unit thereon strippable in whole or in part from the base. In such single color elements stripping membranes may be used to give the layers greater mechanical strength. If both the dye intermediate or color former layer are separable from each other and the base, the element may be so constructed that a selective stripping action occurs. That is, the outer layer can be arranged so that it may be removed from the lower co-acting layer before the lower layer becomes removable from the base.

Part of the color processing of the novel film elements hereof can be completed before stripping the color component units or color yielding layers. In some instances a complete dye image can be produced before stripping becomes necessary. In such instances, it becomes unnecessary to transfer the stripped layers to a temporary support to complete processing.

A practical two-color stripping element comprises a transparent base having a light sensitive or reducible silver salt layer on each side thereof, and a separate dye intermediate or color former layer contiguous with the silver salt layer. The color yielding layers comprise an immobile dye intermediate or color former which in some instances forms a dye complementary in color to the utilized sensitivity of the respective co-acting reducible silver layer. A stripping stratum, layer or membrane is interposed between the base and the sensitive layers or between the color former layers and light sensitive layers or both and may even form a part of the color former layers.

A practical 3-color element has two differentially sensitive reducible silver salt layers with the contiguous dye intermediate or color former layers separated by the transparent base. A third layer is separated from the nearest silver salt layer by at least two layers. The two layers may be the two respective dye intermediate or color former layers, but in some instances at least one additional layer is provided. Separate stripping stratum, layers and membranes are provided in the element so that the contiguous dye color former and reducible silver salt layers can be separated from the base or adjacent light sensitive layer and cooperating color former layer. Additional water permeable layers or strata may separate the reducible silver salt emulsion layers and/or color former layers.

The elements for multicolor photography further contain filtering layers or strata. Thus, filtering dyes or pigments which absorb certain wave length bands of light may be provided in the elements so that certain spectral bands of light will be absorbed and thus do not pass into inner layers which are so disposed as to record different wave lengths. The filtering materials or strata may be disposed in the color former layers or in intervening layers, which in this case are composed of water permeable colloids.

The known types of water-soluble or water-swellable adhesives which have been used in stripping films may be employed for the novel constructions hereof. A large number of materials which are suitable for the stripping or adhesive strata or layers are readily available and may be used in making the novel stripping elements hereof. Water soluble, or alkali soluble cellulose derivatives e. g., methylcellulose, ethylcellulose, cellulose acetic acid or cellulose glycollic acid and its water soluble salts, such as alkali metal, ammonium and amine salts; water soluble starch derivatives, e. g., starch glycollic acid and its water soluble salts; water or alkali soluble resins, e. g., polyvinyl alcohol, polyvinyl vinyl esters, e. g., formates, etc.; alkyd resins, polyamides, water sensitive polymeric amino-nitrogen containing bodies, insoluble in water and 5% ammonium hydroxide, but soluble in aqueous acetic acid of concentrations in the range of about 2 to about 5% and preferably in the lower portion of this range, etc., may be used.

The last-mentioned polymeric amino-nitrogen bodies have especially desirable properties for certain purposes in that the layer is not dissolved by the alkaline developer or water rinse baths, but is solubilized by the acids present in and at the concentrations usually obtained in the acid photographic processing baths such as acid stop baths, fixing baths, reversal bleach baths, etc. This is of importance for the reason that such strip films do not tend to loosen and float away from the temporary support in developing baths. Suitable specific materials are deacetylated chitin, piperidylmethylzein, dicyclohexylaminoethylmethacrylate, piperidyl-N-ethyl methacrylate and morpholino-N-ethyl methacrylate. Other materials of this type which may be used include the deacetylated chitin which may be prepared according to Rigby U. S. Patent 2,040,879; the acid soluble reaction products of proteins with carbonyl compounds such as lower aliphatic aldehydes and ketones and amines having less than nine carbon atoms in which the amino-nitrogen is joined to the aliphatic carbon, for example, those disclosed in Meigs U. S. Patent 2,143,023, January 10, 1937; the aminocelluloses soluble in dilute acetic acid and containing an amino-nitrogen removed from the cellulose nucleus by a chain of atoms comprising at least one carbon atom, for example, those described in Hardy U. S. Patent 2,136,296; cellulose amines which are soluble in a stoichiometrical amount of 5% aqueous acetic acid containing directly attached to the cellulosic nucleus from 0.5 to 1.5 amino-nitrogens per glucose unit, these amino-nitrogens being attached to nucleus carbon atoms, for example, those in Haskins U. S. Patent 2,136,299; reaction products of vinyl ketone polymers with amino compounds, for example, those described in Balthis U. S. Patent 2,122,707; the products obtained by treating resins having ketone groups with an excess of ammonia or the equivalent thereof and hydrogenating the resulting mixture catalytically at superatmospheric pressure and temperature, such as those described in Greenewalt U. S. Patent 2,063,158; polymeric amino alcohol esters of acrylic and substituted acrylic acids, for example, those described in Harmon U. S. Patent 2,138,762, November 29, 1938; and the polymeric amino alcohol methacrylates described in Graves U. S. Patent 2,138,763, etc., singly or in combination. These polymeric amino-nitrogen containing substances are insoluble in water and 5% aqueous ammonia but soluble in aqueous acetic acid of some concentration within the range 2–5%. Those soluble in 2% acetic acid are preferred. These polymeric-nitrogen containing substances may be divided in several groups as follows:

(1) Those which may be termed cellulose derivatives. This includes, although not with strict accuracy, deacetylated chitin and the alkylamino and amino-alkylcelluloses above-identified.

(2) The second group consists in synthetic resins in the formation of which ammonia in some instances and monomeric-amino-nitrogen containing bodies in other instances have been employed. This group is distinct in that the highly polymeric molecules are built up wholly by artificial means. They are not synthesized by nature. In addition to the resinous polymeric amino alcohol esters of acrylic acid or of its homologs substituted in the alpha position by a hydrocarbon radical, there may be employed resinous reaction products of phenols, aldehydes and ammonia or primary or secondary amines, for example, the reaction product of meta-cresol, formaldehyde and dimethylamine.

(3) The third group consists of protein derivatives containing sufficient amino-nitrogen to enable them to meet the solubility requirements of the definition above given.

The invention and the structure of representative types of stripping elements will be more readily understood by a consideration of the accompanying drawings, in which Fig. 1 is a diagrammatical cross-section of a stripping film for single color photographs or color component records.

Fig. 2 is a diagrammatical cross-section of a modified stripping film for single color photographs or color component records.

Fig. 3 is a diagrammatical cross-section of a stripping paper for single color photographs or color component records.

Fig. 4 is a diagrammatical cross-section of a modified stripping paper for single color photographs or color component records.

Fig. 5 is a diagrammatical cross-section of a stripping film for two-color photographs or color component records.

Fig. 6 is a diagrammatical cross-section of a modified stripping film for single color photographs or color component records.

Fig. 7 is a diagrammatical cross-section of a stripping film for three-color photography or color component records.

The invention will be further illustrated but is not intended to be limited by the following examples:

*Example I*

Referring to Fig. 1, a cellulose acetate film base 1 is suitably subbed and then coated with a light sensitive silver bromide emulsion to form a thin layer 2, next is coated an aqueous solution of sodium cellulose glycollate to form a thin layer 3, and finally is coated a gelatin dispersion containing as an immobile blue-green color former, 1,5-stearyl-aminonaphthol to form a thin layer 4.

A second element is made by substituting for the blue-green color former of layer 4 an immobile magenta color former such as 4,4'-o-sulfobenzylidine bis - m - dodecylaminophenylmethyl pyrazolone.

A third element is made by substituting for the blue-green color former of layer 4 a yellow color former such as diacetoacetaminobenzidide.

The appropriate three-color separation negatives are printed onto the respective stripping films just described and they are each then developed in a solution of the following composition:

| | |
|---|---|
| p-Amino-N-diethylaniline hydrochloride | grams 4 |
| Sodium sulfite (anhydrous) | do 3 |
| Sodium carbonate | do 25 |
| Water to | liter 1 |

The three color former layers 4 which now contain blue-green magenta and yellow dye images, respectively, which color component records are washed and finally transferred in register to a permanent support which may be a transparent film base or a white and reflective base, such as paper, whereupon a natural color transparency or reflection print is obtained.

Example II

Referring to Fig. 2, a cellulose acetate film base 1 is coated with a light sensitive silver bromide emulsion to form a thin layer 2, next is coated an aqueous gelatin dispersion comprising 6 parts of gelatin, 1 part of 1,2-oxy naphthoyl-p-dodecylanilide and 1/100 part of sodium stearate to form a thin layer 5.

A similar film was made by substituting for the blue-green color former 1-(m-octadecoylaminophenyl)-3-methyl-5-pyrazolone.

A similar film wasc made by substituting for the blue-green color former as a yellow color former, dibenzoylacetzenzidide.

Appropriate 3-color separation negatives are printed onto the respective stripping films prepared and they are each developed in an aqueous solution of the following composition:

| | |
|---|---|
| p-Amino-N-diethylaniline | grams 2 |
| Sodium carbonate | cc 25 |
| Sodium sulfite, anhy | gram 1 |
| Potassium bromide | do 1 |
| Water to | liter 1 |

The three color former layers 5 which now contain blue-green, magenta and yellow positive dye images are washed and finally transferred to a permanent support as in Example I, whereupon a natural color transparency or reflective print is obtained as the case may be.

Example III

As shown in Fig. 3 a support of double weight photographic paper having a glossy barytes coating 6 is coated with a solution of deacetylated chitin consisting of:

| | Grams |
|---|---|
| Deacetylated chitin | 4.00 |
| Lactic acid | 4.75 |
| Ethyl alcohol (35%+water 65%) | 91.25 | to form a stripping layer 7. Over this is coated a thin nitrocellulose layer 8 which is subbed by coating it with a solution of

| | Grams |
|---|---|
| Gelatin | 1.0 |
| Acetic acid, glacial | 3.0 |
| Ethyl alcohol | 96.0 | to form a layer. A light sensitive silver halide-gelatin emulsion which preferably contains optical or gelatin sensitizers is coated onto the sublayer, to form a thin layer 10. Onto layer 10 is coated a gelatin dispersion of the immobile color former as set forth in Example I, to form a color yielding layer 11.

The film element is exposed and then developed in a color forming developer of the type set forth in Example I. The film is then treated in a potassium bichromate bleach bath containing sulfuric acid and then fixed in an acid hardening fixing bath. The color yielding unit and the temporary base may be stripped from the paper base in the acid bleach bath. If the stripping action of the layer is not very rapid it may be removed in the fixing bath. After bleaching and fixing the film may be transferred to a permanent support in register.

Example IV

A stripping film as shown in Fig. 4 may be made by coating a paper base 6 with a layer 12 of polyvinyl alcohol, next a cellulose nitrate layer 13, then coated with a subbing layer 14 of cellulose nitrate, and then coated with a gelatin silver bromide-iodide emulsion layer 15 and finally a gelatin dispersion of the immobile color former 1,2-oxynaphthoyl-p-dodecylanilide, to form a layer 16. The element may be processed after the manners set forth in Examples I, II or III. Stripping may be accomplished after first development.

A similar film may be prepared by interposing a clear gelatin layer between layers 15 and 16. Similar elements may be prepared by substituting a film forming dye intermediate color former for the gelatin dispersed dye intermediates or color formers of the elements described in this example.

Example V

Three stripping films were made after the manner set forth in Example I by substituting for the blue-green color former m-octadecyloxyphenol, for the magenta color-former, 4,4'-bis-(3"-methylpyrazolonyl-1") biphenyloxide for the yellow color former acetoacetaminophenylmorpholine, and for the stripping layer thereof, a layer applied from a solution of deacetylated chitin consisting of

| | Parts |
|---|---|
| Deacetylated chitin | 4.00 |
| Lactic acid | 4.75 |
| Ethyl alcohol | 91.25 |

The stripping films are printed under the appropriate color separation negative, developed in a metol-hydroquinone developer to the desired contrast, fixed, stripped off and transferred to a temporary support, bleached in a 3% aqueous solution of potassium ferricyanide containing a few drops of ammonium hydroxide, washed and redeveloped in p-amino-N-diethylaniline, washed, treated with Farmer's reducer to remove the silver image, washed and finally transferred to a permanent support which may be transparent or white and reflective.

Example VI

Referring to Fig. 5, a duplicoated stock provided with two removable color yielding component layers is prepared by coating a film base 1 on each side with a positive type gelatino silver bromide emulsion containing 4 grams of tartrazine per kg. of emulsion to form thin layers 2 and 2'; upon these layers are coated a polyvinyl alcohol water solution to form thin layers 3 and 3'. A gelatin dispersion of the yellow color former diacetoacettolidine sulfone is coated on layer 3 to form a thin layer 4. On layer 3' is coated a gelatin dispersion of the magenta color former 1-(m-stearoylaminophenyl)-3-methyl-5-pyrazolone to form a thin layer 4'.

The element just described may be printed from the blue and green negative color composition records of a tri-pack combination and processed to color images as in the previous example. The yellow and magenta color image elements thus produced can be combined with a blue-green color element produced on a separate stripping element to form a complete color photograph.

Example VII

A film element of the type set forth in Example VI is prepared by substituting for the color former of layer 3 a mixture of the yellow color former prepared by condensing o-sulfobenzaldehyde with diacetoacet-tolidine sulfone and a magenta color former such as 1-(m-stearoylaminophenyl-3-methyl-5-pyrazolone, and for the color former of layer 3', 1,2-oxynaphthoyl-p-lauryl anilide.

This element may be used for printing bipack negatives (2-color) and will serve for the complete record. The front negative film of the bipack is printed onto layer 3 and the rear negative film printed onto layer 3'. The film is then developed in a bath of the following composition:

| | |
|---|---|
| 2-amino-5-diethylamino toluene hydrochloride _____grams__ | 4 |
| Sodium sulfite, anhydrous_____do____ | 2 |
| Water to _____liter__ | 1 |

The layers 4 and 4' which now contain orange-red and blue-green dye images, respectively, are now stripped from the remainder of the film element and superposed on a permanent support which may be a transparent film or a paper.

For improved registration, it may be desirable to strip the respective color formers without making direct contact with the permanent support. For this purpose very thin membranes and a water soluble adhesive, e. g., collodion, etc. may be used. These may be firmly pressed onto the color layers. Other suitable materials are synthetic resins, e. g. polyvinyl esters such as polymerized vinyl acetate; polyvinyl acetals which are the condensation products of partially or completely hydrolyzed polyvinyl acetate and an aldehyde such as formaldehyde, acetaldehyde or butyraldehyde, alkyd resins, i. e., condensation products of polybasic acid compounds and polyhydroxy alcohols, e. g., from phthalic, adipic, succinic, maleic, fumaric, etc., acids and anhydrides with glycerol, ethylene glycol, diethylene glycol, pentaerythritol, sorbitol, etc.; nylon, i. e., film forming amide polymers (see U. S. Patents 2,071,250, 2,071,253, 2,130,948, and 2,141,169), etc.

The use of thin membranes is desirable when a color-former which is composed of a film forming material containing within its structure dye forming nuclei because such films need additional support or strength when they are stripped from other layers. Such films are of considerable utility and have definite advantages since processing need not be carried beyond color development and washing. The color images are removed after first development and the remainder of the film may be discarded if desired without bleaching and fixing.

Example VIII

A film element as shown in Fig. 6 is prepared by coating a cellulose nitrate film base 1 with a gelatin subbing layer 7, next with a stripping layer 3 comprising:

Piperidylmethylzein
Acetic acid
Ethyl alcohol next a thin film of nitrocellulose obtained by coating layer 3 with a solution comprising:

| | Grams |
|---|---|
| Nitrocellulose (80-120 sec. 11.9-12.1% N) ___ | 6.0 |
| Glycerine _____ | 2.3 |
| Urea _____ | 2.3 |
| Dibutyl phthalate _____ | 1.2 |
| Methyl alcohol _____ | 88.2 |

This thin, water-permeable nitrocellulose film is then provided with a substratum coating 17 obtained by coating the nitrocellulose film with a solution of

| | Grams |
|---|---|
| Gelatin _____ | 1.0 |
| Acetic acid, glacial _____ | 3.0 |
| Ethyl alcohol _____ | 96.0 |

The sensitive silver halide gelatino emulsion 18 which preferably contains optical or gelatin sensitizers, is then coated onto the substratum layer. Then a color former layer 19 is coated from a gelatin dispersion containing an immobile color former such as the salicylaldehyde phthalaldehydic acid acetal of polyvinyl acetal. After the emulsion has been exposed it is developed in an ordinary metol-hydroquinone developer. It is then washed, fixed in an ordinary acid-hardening fixing bath, a suitable formula for which is as follows:

| | |
|---|---|
| Hypo, crystals _____grams__ | 240 |
| Sodium sulfite, anhydrous _____do____ | 15 |
| Acetic acid, glacial _____do____ | 15 |
| Boric acid _____do____ | 5 |
| Potassium alum _____do____ | 8 |
| Water to _____liter__ | 1 |

While the film is in the fixing bath, the piperidylmethylzein is solubilized by the acetic acid of the bath and the emulsion layer with its thin film support can be stripped from the temporary or original support and transferred to the second support whereupon it can be bleached, color developed and the silver and silver salts removed, then transferred to the final support.

Various types of immobile dye intermediates or color formers may be substituted with similar results. The resulting films are extremely useful when the proper color formers are chosen in the preparation of natural color prints. In general, each stripping film should contain the dye intermediate color former to reproduce the proper color record from the particular color separation negative employed for printing.

A multilayer film element as shown in Fig. 7 is made by successively coating a subbed cellulose nitrate film base 1, a stripping membrane 20 composed of nitrocellulose, next with a red sensitive silver bromide emulsion layer 21, next a gelatin layer 22 containing as an immobile blue-green color-former the octadecyl ether of resorcinol, next is coated an acid stripping layer 23 from a solution containing:

| | Grams |
|---|---|
| Piperidylmethylzein _____ | 4.0 |
| Chrome alum _____ | 0.2 |
| Sulfamic acid _____ | 4.8 |
| Ethyl alcohol (65% water) _____ | 91.0 |

A thin film 24 of water-insoluble water permeable ethylcellulose is coated from a solution of:

| | Grams |
|---|---|
| Ethylcellulose _____ | 5.0 |
| Methyl acetate _____ | 77.0 |
| Acetone _____ | 11.7 |
| Xylene _____ | 6.3 |

On layer 24 is coated a green sensitive gelatino silver bromide emulsion layer 25, then a gelatin layer 26 containing an immobile color former such as 1-(m-stearoylaminophenyl)-3-methyl- 5-pyrazolone, over which is coated an alkali stripping layer 27 from a solution of

| | Parts |
|---|---|
| Gelatin | 2.0 |
| Dextrin | 2.0 |
| Water | 96.0 |

Next is coated a thin membrane 28 of a water-insoluble water-permeable ethyl cellulose from a solution of

| | Grams |
|---|---|
| Ethylcellulose | 5.0 |
| Methyl acetate | 77.0 |
| Acetone | 11.7 |
| Xylene | 6.3 |

Then a blue sensitive gelatino silver bromide emulsion containing a removable yellow filter dye such as tartrazine to form a layer 29, and finally a gelatin layer 30 containing a yellow color former such as benzoylacetamino phenylmorpholine.

After exposure to a colored object or scene this multilayer stripping film is developed in a non-hardening alkaline developer. At the completion of development unit A is stripped off and transferred to another support whereupon the silver image can be bleached in an ordinary sulfuric acid-potassium dichromate reversal bleach bath. However, for purer color, a sulfamic acid-potassium dichromate bleach bath as described in United States Patent No. 2,195,419, is used since with this bleach bath no alkali metal bisulfite clearing bath is required and thus the color-former is not contaminated with bisulfite which tends to degrade the color. The film is then washed, re-exposed and developed in a p-amino-N-dialkyl-aniline developer, a suitable formula for which is:

| | |
|---|---|
| p-Aminodiethylaniline | grams 8 |
| Sodium carbonate, anhydrous | do 40 |
| Sodium sulfite, anhydrous | do 5 |
| Water to | liter 1 | to yield an insoluble yellow azomethine dye in situ with the silver image. After washing the film, the silver image is removed by means of the ordinary Farmer's reducer and the yellow image transparency is given the final wash.

At the completion of fixation, film unit B is stripped off, transferred to a temporary support, washed, bleached, re-exposed and redeveloped in the p-amino-N-dialkylaniline developer as described above and the silver image removed in the manner described. Film unit C, fixed to the original support, is washed, reversed, re-exposed, re-developed and the silver removed as indicated above, thus revealing the glue-green dye image. Then the magenta dye image bearing film unit B is transferred from its temporary support and squeezed into register on the blue-green image layer and the same operation is carried out with the yellow image film unit A. Thus, a multicolor, positive transparency is produced by the use of this selectively delayed stripping film, one of the stripping layers of which comprises a polymeric amino-nitrogen containing body, insoluble in water and 5% ammonium hydroxide but soluble in 2% acetic acid.

The invention is not limited to the particular arrangement of layers set forth in the preceding example. On the contrary, various types of three color films may be prepared by placing the color former layers in different manners. Thus, the types of 3-color film elements disclosed in application Serial No. 349,228, filed August 1, 1940, may be used by further modifying such structures with stripping layers and/or membranes between respective units of light-sensitive layers and the co-acting color former layers. Thus, two-color former unit layers may be placed on one side of the support and one unit on the other.

A green blind red sensitive silver halide layer may, for example, constitute the middle unit of a 3-color element having three units on one side of a single support, and appropriate stripping layers interposed so that the respective units may be similarly processed.

In the embodiment of the invention wherein no re-exposure to light is used, the dye forming solutions set forth in Meschter application, Serial No. 259,686 now U. S. P. 2,310,981, may be used with excellent results.

In place of the specific immobile color formers set forth in the preceding examples may be substituted a large number of exceedingly diverse dye intermediates or color formers capable of forming indophenol, indoaniline or azomethine dyes. The types which are to be dispersed in gelatin or other similar colloid binding agents may be (1) substantive to the gelatin or binding agent (2) soluble in aqueous alkaline liquids but fast to diffusion when present in emulsion layers, (3) colloidal in nature so that they cannot be removed by simple extraction from the layer, (4) of high molecular weight so that migration through the cellular structure of the binding agent is prevented, (5) highly insoluble, (6) film forming. Substantivity can be strengthened by agents which have precipitating action, e. g., diphenyl guanidide, diphenylbiguanidide, etc.

The immobile dye intermediates or color formers in general contain two components, (1) a color forming dye coupling component or nucleus and a component group or nucleus which increases the molecular weight so that they become immobile in water permeable colloid layers, or (2) groups for imparting substantive character (which may be of the same type as used in making dyestuffs substantive to cotton), or (3) groups or structures which make it colloidal in character.

Suitable dyestuff components for color-forming development and azo reversal processes hereof which fall within one or more of the above types of immobile color formers include:

1. Higher aliphatic and cycloaliphatic derivatives of dye intermediates wherein the aliphatic radical such as an alkyl, alkoxy or long chain carboxylic acid acyl radical contains a carbon chain of more than 8 carbon atoms and preferably at least 12 carbon atoms, such compounds including active methylene compounds such as aroyl- or acylacetanilides, phenylmethylpyrazolones, etc., higher aliphatic amides of phenolic compounds, and alpha-and beta-naphthols which preferably contain some solubilizing group such as carboxyl or sulfonic, which are characterized in that they have a reactive position capable of entering the coupling reactants but not necessarily an unoccupied position ortho or para to the phenolic hydroxyl group. Suitable compounds of the cycloaliphatic type are set forth in U. S. Patent 2,189,817.

2. Polyvinyl acetals of aromatic aldehydes which are capable of reacting with diazo compounds and the oxidation products of photographic color developers. The acetals are formed from polyvinyl alcohol or partially hydrolyzed polyvinyl esters and aromatic aldehydes which contain a phenolic hydroxyl, amino, alkyl-, cycloalkyl-, or aryl-substituted amino group including mixed groups of this type, which are further characterized in that they have a reactive position, but not necessarily unoccupied position, ortho or para to the mentioned groups or the aromatic aldehydes having an active methylene group. The preparation of suitable compounds of this type is set forth in Dorough & McQueen application, Serial No. 233,480, filed October 5, 1938 now U. S. P. 2,310,943.

3. Condensation products of phenols and naphthols or hydroxy aromatic carboxylic or sulfonic acids with difunctional resin forming reagents such as aldehydes and ketones, dimethylol derivatives of phenols, amides and amines and equivalent compounds. The preparation of suitable color formers of this type is described in McQueen application, Serial No. 261,794, filed March 14, 1939, now U. S. P. 2,323,481.

4. Condensation products of amine-containing dye intermediates such as aminophenols, aminonaphthols, N-aminoalkyl- or aminoaryl-aminonaphthols, amine containing active methylene compounds such as amino aroyl- or acetyl-acetanilids, amino-phenylmethylpyrazolones or any of the preceding compounds containing solubilizing groups such as carbonyl or sulfonic, with polycarboxylic acids and their derivatives such as the anhydrides, esters, amides or halides. Such polymeric acids include the olefin-maleic anhydride interpolymers, polyacrylic acids and interpolymers of esters of olefin dicarboxylic acids with vinyl esters, olefins and styrene as described in U. S. Patent 1,945,307.

5. Immobile dye intermediates formed from N-mono and dialkylated or aralkylated 1,5- and 1,8-aminonaphthols containing in a side chain a group capable of further condensation such as amino, thio, carboxyl, formyl, etc., by condensing said compound with a suitable high molecular weight compound such as aliphatic acids or amines with more than 8 carbon atoms or polymeric materials such as polyvinyl alcohol or polymeric acids or derivatives as listed above in paragraph 4.

Suitable immobile dye intermediates of the above and other types which are useful for color development and azo-coupling processes are disclosed in U. S. Patents 2,154,918, 2,166,181, 2,178,612, 2,179,228, 2,179,238, 2,179,239, 2,179,244, 2,186,045, 2,186,719, 2,186,734, 2,186,735, 2,186,736, 2,186,849, 2,140,540, 2,133,937, 2,200,924, etc., and may be substituted for the dye intermediates of the above examples in accordance with the teachings hereof.

The preferred developing agents which may be used in the dye coupling development steps hereof are derivatives of p-phenylenediamine and particularly the asymmetric dialkyl p-phenylenediamines of 1 to 4 carbon atoms, e. g., p-aminodimethylaniline, p-aminodiethylaniline, p-aminodibutylaniline, etc. Other developing agents which may be used include p-phenylenediamine itself, p-methylaminoaniline, p-ethylaminoaniline, p-aminophenol, N,N-diethyl-o-phenylenediamine, chloro-p-phenylenediamine, 1,2,5-toluylenediamine, 2-amino-5-diethylamino-toluene, p-amino-N-phenylmorpholine, N-p-aminophenylpiperidine, N-methyl-N-hydroxyethyl-p-phenylenediamine, N-butyl-N-hydroxyethyl-p-phenylenediamine, 2-amino-5-(N-butyl-N-hydroxyethyl) aminotoluene, β-γ-dihydroxypropyl-p-phenylenediamine, etc. These aromatic amino-developing agents in the form of their organic or inorganic acid salts may be used in the preparation of the developing solutions. The salts are in general more stable than the free bases. As examples of suitable salts, mention is made of the hydrochlorides, sulfates, acetates, etc.

Further examples of developing agents that can be used in this process are—heterocyclic compounds containing benzene nuclei such as 1,2,3,4-tetrahydro-6-aminoquinoline, 1,2,3,4-tetrahydro-6-amino-quinoxyline, etc. (British Patent 478,345); o-aminophenols and their substitution products (French Patent 806,649); N-hydroxyalkyl p-phenylenediamine (British Patent 460,580); halogenated p-aminophenols (French Patent 813,902); p-phenylenediamine derivatives containing solubilizing groups in the positive radical connected to the N atom (French Patent 822,269); di-N-hydroxyalkyl p-phenylene-diamine derivatives (U. S. Patent 2,108,243), etc.

The stripping films hereof are not limited to color forming development processes. On the contrary, azo reversal processes as set forth in aforesaid application Serial No. 349,228, may be used with successful results. Suitable diazo solutions for preparing remote images in the color former layers only may be prepared from many primary amines and aromatic amines which are suitable for diazotizing and coupling to azo dyes are well known in the art (see Fierz-Davis "Kunstliche Organische Farbstaffe" and J. C. Cain "The Chemistry of the Diazo Compounds," pages 6–26) They are in general of the type $RNH_2$ where R is aromatic or a heterocyclic ring such as pyridine, pyrazolone, etc. The R may also be substituted with various groups such as halogen, alkyl, alkoxy, aryl, sulfonic, carboxyl, etc. In choosing the amine to be used there are in general two considerations to be observed, (1) the diazo compound must be sufficiently active to couple readily with the dye intermediate used at a relatively low temperature and in aqueous solution; (2) the diazo compound must be one which can be coupled to yield bright azo dyes with spectral characteristics suitable for use in three-color photography, that is, they must have fairly definite and sharp absorption bands. Thus, the most suitable amines are those containing halogen, alkoxy, nitro, carboxy, and sulfonic acid groups.

For successful operation of the azo reversal processes hereof, it is necessary to have diazonium compounds that will couple with three colorless components to yield the three subtractive primary colors, yellow, magenta and blue-green. Almost all diazotizable amines can be coupled with phenolic coupling components and active methylene compounds such as phenyl-methyl pyrazolone, acetoacetanilide and aroyl-acetanilides, etc., to yield greenish-yellow to orange-yellow azo dyes. The number of combinations that yield magenta dyes is somewhat limited, since the coupling component to conform to the previously mentioned requirement must be substituted alpha naphthols, and only a limited number of diazonium compounds will condense with such components to form magenta colors. Thus, diazotized aniline derivatives yield a magenta color only when substituted in the ortho or para position with such groups as phenyl and nitro. Tetraazotized diamino compounds such as benzidine and diaminonaphthalene derivatives substituted with halogen, alkoxy, and sulfonic acid groups may also be used. In forming the blue-green azo color, the choice is further restricted since the best colorless coupling components which adhere to the previous qualifications are derivatives of 1,5 and 1,8-aminonaphthol in which the amino group is preferably secondary or tertiary, and must remain basic. The preferred diazotizable amines that can be used for forming all three colors therefore are substituted benzidine derivatives containing halogen, alkyl, nitro, carboxyl, alkoxy or sulfonic acid groups, and substituted para-nitro-aniline derivatives containing the 2 position halogen, alkoxy, nitro, carboxyl or sulfonic acid groups which all give desirable properties to the diazo components and to the dyes.

While gelatin has been described as the binding or supporting agent in the majority of the examples, the invention is not limited to the use of this material. On the contrary, a large number of materials some of which are readily available can be substituted in similar amounts and coated in the above manners. Natural and synthetic materials such as gums, resins, cellulose derivatives, carbohydrate derivatives, etc. The materials in general must be substantially cold water insoluble but water permeable.

Suitable specific materials include polyvinyl alcohols including partially hydrolyzed polyvinyl esters, e. g., polyvinyl chloride and polyvinyl acetate; modified with resins such as polyvinyl acetals so that they have the above recited properties. The acetals may be formed from acetaldehyde, propionaldehyde, isobutyraldehyde, benzaldehyde, etc., ketones, glyoxylic acid, etc., alkyd resins including the modified alkyd resins which are prepared from polyhydric alcohols, e. g., glycerol, ethylene glycol and higher glycols and polybasic acids, e. g., phthalic, maleic, succinic, etc.

Condensation products of phenols, of naphthols, or of hydroxy aromatic carboxylic or sulfonic acids with bifunctional resin-forming reagents, for example, aldehydes and ketones, dimethylol derivatives of phenols, of amides, or of amines, and of equivalent compounds may be used.

Condensation products of amine-containing dye intermediates, with polycarboxylic acids or with their derivatives such as the anhydrides, esters, halides, or amides may be used. Polymeric acids of this type and their derivatives include the polyvinyl ethers of hydroxy acids, olefin-maleic anhydride interpolymers, polyacrylic acid, polymeric olefin dicarboxylic esters and interpolymers of esters of olefin dicarboxylic acids with vinyl esters and styrene as described in U. S. Patent 1,945,307.

The above and equivalent materials as previously indicated can be used as binding agents for the color yielding layers as well as the silver salt layers or intervening layers in each of the herein described constructions of film elements.

While cellulose derivatives have been described in the majority of the examples, various other types of transparent, translucent as well as opaque supports may be used. Synthetic resins including acrylic and hydrocarbon substituted acrylic acid resins, meta-styrene resins, vinyl resins, e. g., vinyl chloride acetal, polyvinyl acetals, synthetic linear polyamides, glass, paper and many other materials may be used.

Various types of reducible silver salts may be used in the light sensitive layers. Initially they are generally silver halide layers such as simple and mixed chloride, bromide, and iodide emulsions, including silver bromide, silver chloride, silver chloride-bromide, silver bromide-iodide, silver iodide, etc., or the type used in the more conventional film elements used for color forming development. They may contain the usual emulsion components such as stabilizers, antifogging agents, sensitizing dyes, e. g., cyanine, carbocyanine, pseudocyanine, merocyanine, cyazine, carbocyazine, pinaflavol, etc., salts and bases; etc. These light sensitive emulsions after development to silver images may be bleached in the usual manner to form silver ferrocyanide images before color development or color formation.

The particular types of coating solutions used can be made up and coated in a manner similar to those which have been used in the manufacture of film elements containing immobile dye intermediates in emulsion layers. The immobile dye intermediates may be dispersed in the binding agents while in a finely divided state using dispersing agents if desired and/or alkalies. In many cases it is practical to dissolve the dye intermediate or color former in a 5 to 10% caustic alkali to form a soluble paste. This may be then diluted with about 5 parts of water and about 1 part of alcohol added to 5% aqueous gelatin and the excess alkali neutralized with a mineral acid such as hydrochloric. The usual photographic coating ingredients, spreading agents, e. g., glycerine, saponine, long chain alkyl sulfates, etc., may be employed. The concentration of the coating solution is adjusted to yield the desired thickness.

The usual types of subbing solutions may be used for anchoring the silver halide emulsion layers to the base and to adjacent color former or intervening layers. The usual emulsion subbing solutions may also be employed to anchor the dye intermediate or color former layers to adjacent layers which may be emulsion layers or intervening layers.

The stripping films hereof have a number of decided advantages. In the forms wherein the color former layers are strippable from the light sensitive layers an important economic advantage is attained in that the light sensitive layers may be discarded after initial color forming development, since they require no further processing. A related advantage is the fact that thinner final multicolored elements are produced which have excellent projection properties.

A further important advantage resides in the feature that the sensitivity of the silver halide emulsion layers is not impaired. Many color formers which are readily available and form excellent quinoneimine, azomethine and azo dyes have a very deleterious effect on the speed of photographic emulsions and for this reason cannot be used in prior art elements. In many cases the contrast and sensitivity of the film is excessively depressed, by their incorporation in emulsion layers.

Another important advantage resides in the improved stability of the resulting film elements. The methods employed for incorporating color formers in emulsions often lead to unstable films. The aforementioned disadvantages are overcome by this invention. Furthermore, some color formers fog the sensitive emulsion when incorporated therein. This decided disadvantage is overcome by the present invention.

A further advantage resides in the fact that a wider selection of optical sensitizers is permitted. In a multiple "color element" film, isolating media segregate each element in such fashion that dye image formation is dependent only on processing steps within the photographic layer associated with each respective "element."

The invention also provides the following production advantages.

(a) Color former dispersions may be prepared in advance of the coating schedule. They may be standardized for degree of dispersion, colloidal stability, and color forming strength. All these operations may be carried out in white light areas; darkroom conditions being unnecessary prior to the coating operation.

(b) The consumption of costly materials is reduced since the colloidal dispersions are relatively stable, thus permitting them to be reworked by re-melting the chilled and jelled dye-forming colloid. On the other hand, previous research has shown that the photographic stability of light sensitive emulsion-color former preparations is short-lived and the uncoated preparations deteriorate rapidly even under refrigerated storage conditions.

As many apparently widely different embodiments of this invention may be made without departing from the spirit and scope thereof, it is to be understood that I do not limit myself to the specific embodiments herein except as defined by the appended claims.

I claim:

1. A stripping photographic element comprising a base having superposed thereon at least two coacting layers, one of which is light sensitive and the other of which is light insensitive and cold-water insoluble and comprises an immobile dye intermediate capable of forming both an azo dye and a dye selected from the group consisting of indophenol, indoaniline and azomethine dyes and a stripping layer comprising an adhesive stratum composed of an adhesive taken from the group consisting of water-soluble and water-swellable adhesives and of different composition and solubility characteristics from the aforesaid two coacting layers and which is disposed in the element in such a manner that at least one of aforesaid coacting layers is removable from the base by a stripping process; each of said layers being permeable to aqueous developer solutions.

2. A photographic element comprising a support, at least one color yielding unit releasably attached to said support by means of a water-soluble adhesive, said unit comprising a light-sensitive silver halide layer and at least one coacting, light-insensitive, water-permeable, separate layer comprising an immobile dye intermediate capable of forming both an azo dye and a dye taken from the group consisting of indophenol, indoaniline and azomethine dyes, said adhesive being of different composition and solubility characteristics from the aforesaid two coacting layers.

3. An element as set forth in claim 2 wherein the silver halide layer is outermost.

4. An element as set forth in claim 2 wherein the silver halide layer is adjacent the support.

5. An element as set forth in claim 2 wherein said support is paper.

6. An element as set forth in claim 2 wherein said support is a transparent film base.

7. A stripping photographic film comprising a support having superposed thereon at least one light-sensitive silver halide layer and at least one separate coacting light-insensitive layer comprising a cold-water insoluble, water-permeable colloid binding agent containing an immobile dye intermediate which is soluble in aqueous alkaline liquids but fast to diffusion in said colloid and capable of forming both an azo dye and a dye selected from the group consisting of indophenol, indoaniline and azomethine dyes, and a stripping layer comprising an adhesive stratum composed of an adhesive taken from the group consisting of water-soluble and water-swellable adhesives and of different composition and solubility characteristics from the aforesaid two coacting layers and which is disposed in the element in such a manner that at least one of aforesaid coacting layers may be detached in aqueous photographic processing solutions by a stripping process.

8. An element as set forth in claim 7 wherein the silver halide layer is outermost.

9. An element as set forth in claim 7 wherein the silver halide is adjacent the support.

10. An element as set forth in claim 7 wherein said support is paper.

11. An element as set forth in claim 7 wherein said support is a transparent film base.

12. A stripping photographic film comprising a support having superposed thereon at least one light-sensitive silver halide emulsion layer and a separate coacting, light-insensitive layer comprising an immobile dye intermediate in the form of a water-permeable, cold-water insoluble film containing within its structure a dye forming nuclei capable of forming an azo dye and a dye taken from the class consisting of indophenol, indoaniline and azomethine dyes, and a stripping layer comprising an adhesive stratum composed of an adhesive taken from the group consisting of water-soluble and water-swellable adhesives and of different composition and solubility characteristics from the aforesaid two coacting layers, whereby at least one of said coacting layers may be removed from the base by a stripping process.

13. An element as set forth in claim 12 wherein the silver halide layer is outermost.

14. An element as set forth in claim 12 wherein the silver halide layer is adjacent the support.

15. An element as set forth in claim 12 wherein said support is paper.

16. An element as set forth in claim 12 wherein said support is a transparent film base.

17. A photographic stripping film comprising a support, at least one color yielding unit releasably attached to said support by means of a stratum of a water-soluble adhesive, said unit comprising in order a light sensitive silver halide layer, an intermediate, light insensitive, water permeable colloid layer and at least one coacting, light insensitive, separate layer comprising an immobile dye intermediate capable of forming an azo dye and a dye taken from the group consisting of indophenol, indoaniline and azomethine dyes, said unit being permeable to aqueous color coupling developer solutions.

18. An element as set forth in claim 17 wherein the silver halide layer is outermost.

19. An element as set forth in claim 17 wherein the silver halide layer is adjacent the support.

20. A photographic stripping film comprising in order, a support, a light sensitive silver salt layer, a water soluble adhesive stratum, a thin water-permeable transparent membrane, and a light insensitive, color yielding layer which comprises an immobile dye intermediate capable of forming both an azo dye and a dye selected from the group consisting of indophenol, indoaniline and azomethine dyes, said layers, stratum and membrane being permeable to aqueous color-coupling developing solutions.

21. A stripping photographic film comprising a support having superposed thereon at least one light-sensitive silver halide layer and at least one coacting light-insensitive water-insoluble layer comprising a water-permeable colloid binding agent containing an immobile color former, at least one of said layers having attached thereto an adhesive stratum taken from the group consisting of water-soluble and water-swellable adhesives and of different composition and solubility characteristics from the aforesaid two coacting layers, whereby said layer may be detached in aqueous photographic processing solutions by a stripping process.

CLAYTON F. A. WHITE.